SWEEP DEMAND SYSTEM

Filed April 10, 1963

Inventors
HARVEY L. COOK, JR. &
RICHARD A. CLARK
By Mason, Fenwick & Lawrence
Attorneys Inventors
HARVEY L. COOK, JR. &
RICHARD A. CLARK
By
Mason, Fenwick & Lawrence
Attorneys

3,284,568
SWEEP DEMAND SYSTEM

Harvey L. Cook, Jr., Falls Church, and Richard A. Clark, Arlington, Va., assignors to Farrington Electronics, Incorporated, Alexandria, Va., a corporation of Massachusetts Filed Apr. 10, 1963, Ser. No. 272,007
7 Claims. (Cl. 178—7.6)

The present invention relates to a scanning system and more particularly to an optical drive assembly for automatic character recognition systems adapted to scan a copy.

Automatic character recognition apparatus has been heretofore devised for sensing information-bearing documents and producing electrical output signals identifying information sensed by the apparatus. Such equipment may briefly be described as apparatus for scanning intelligence-bearing documents containing items of information such as printed characters, usually in the form of alphabetical letters and arabic numerals, which apparatus senses the presence and/or positional base and relation, and produces signals indicative of the presence and absence of bits of characters within the scanning field, an output being produced at some time indicative of the character read. Examples of typical automatic character sensing apparatus are disclosed in U.S. Patent No. 2,663,758 to David H. Shepard and U.S. Patent No. 2,897,481 to David H. Shepard.

In order to provide for high-speed scanning of character bearing documents such as, for example, pages of paper approximately letter or legal size, it is desirable to linearly scan transversely of the document along each successive line of characters on the page or along a selected line or lines of characters of the page. One of the arrangements for effecting such scanning of the document has been to provide an oscillating sweep mirror which is moved about a pivot shaft, the axis of which is parallel to the vertical axis of the page, wherein a synchronous, motor assembly rotates the shaft to which the mirror is attached, so as to impart a sweep of uniform velocity to the mirror. The length of the sweep motion across the page has been heretofore controlled and limited by a specifically designed cam which is attached to the shaft. In a system such as that described above, it is necessary to synchronize the automatic character sensing equipment with the commencement of a left to right oscillation of the mirror in order to scan a line on the copy, thus rendering the equipment completely dependent on the oscillating mirror.

Those concerned with the development of optical scanning apparatus have long recognized the need for making the automatic character sensing equipment relatively independent of the mirror oscillation apparatus so as to increase the speed of document scanning. A further need recognized is the capability of readily controlling a mirror optical scanning drive assembly so as to produce varied lengths of sweeps wherein the sweep length may be dependent upon the information to be scanned on any one line of a document or the width of the document used, thereby further increasing the speed in scanning the document. The present invention fulfills each of the above needs.

The general purpose of this invention is to provide a mirror optical scanning drive assembly which embraces the advantages of prior art document scanning devices and avoids the aforedescribed disadvantages. To attain this the present invention contemplates a unique mirror drive control assembly whereby a mirror scan of uniform velocity and variable length can be demanded at will.

An object of the present invention is the provision of a high speed document scan mirror drive assembly.

Another object is to provide a demand sweep mirror drive assembly.

A further object of the invention is the provision of a novel document scan mirror drive assembly having means for readily varying the length of the mirror sweep, from line to line on any one document.

Still another object is to provide a simple system for varying the length of a mirror sweep to suit a number of different document widths.

Other objects, advantages and capabilities of the present invention will become apparent from the following detail description, taken in conjunction with the accompanying drawings illustrating preferred embodiments of the invention.

Figure 1:
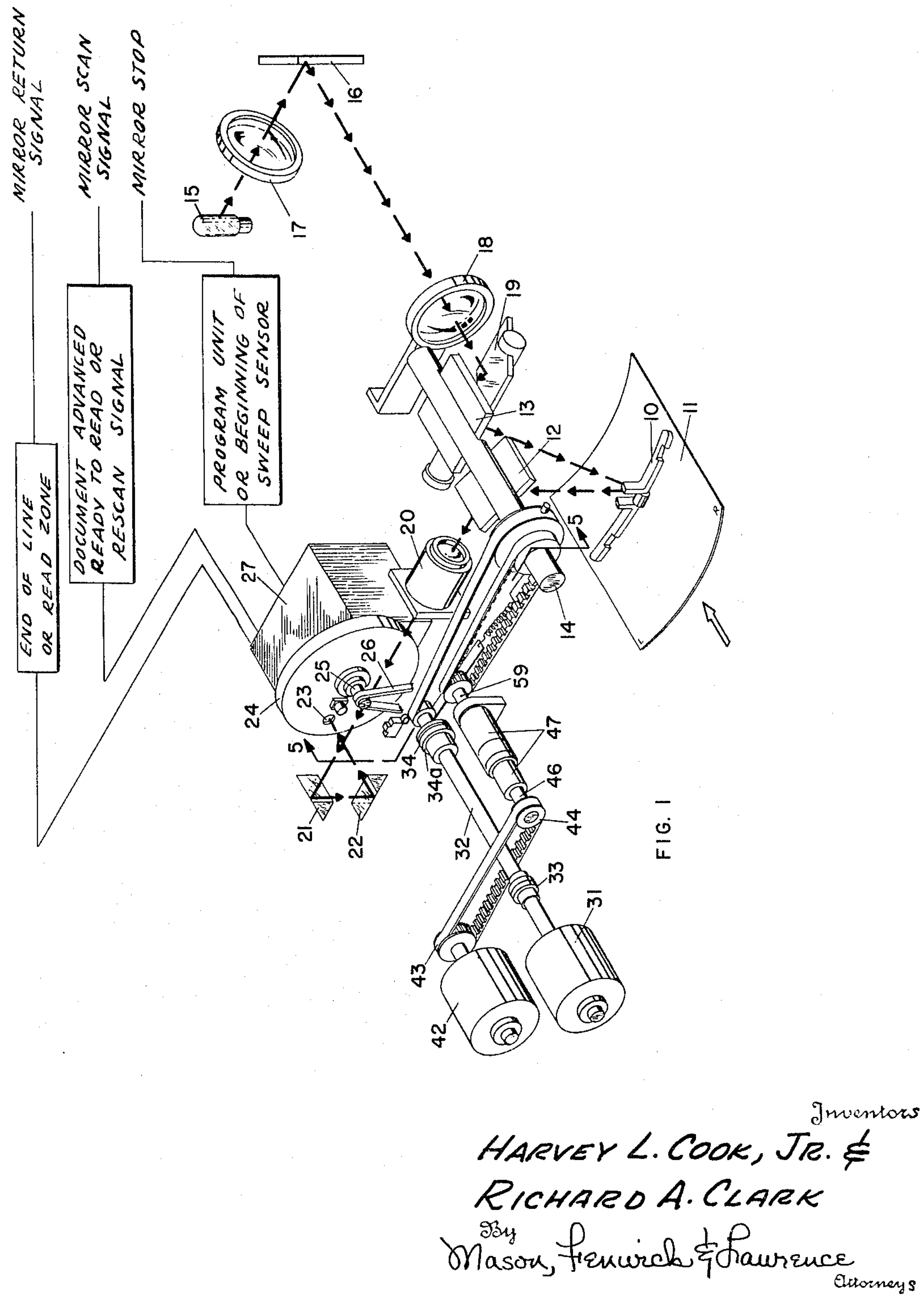
FIGURE 1 is an isometric view illustrating an exemplary form of a sweep demand drive assembly embodying the present invention in conjunction with scanning apparatus with which the present invention may be employed.

Referring to the drawings wherein like reference characters designate corresponding parts throughout the several figures, the embodiment of FIGURES 1 to 3 and 5 is illustrated in FIGURE 1 along with various components of the document scanning apparatus to facilitate understanding of the association of the drive assembly of the present invention therewith, including an element 10 for holding the document or copy 11 stationary while a lateral linear sweep is being made by means of a mirror assembly comprising mirrors 12 and 13 supported on a rotating shaft 14. Light from a suitable light source, such as lamp 15, is directed to mirror 16 through focusing lens 17 and reflected so as to pass a light beam through projection lens 18. The light beam emerging from lens 18 is reflected from stationary mirror 19 which is fixed at a predetermined angle so as to redirect the beam of light to the center of oscillating mirror 13 fixed on shaft 14, which redirects the beam of light to the area on the page being scanned by the oscillating mirror 12. The mirror 12 redirects light reflected from the document 11 via reading lens 20 through a pair of prisms 21 and 22 and thence through the opening 23 to focus the image of the document on the plane of a scanning disc within cover 24, for example of the type disclosed in earlier Shepard Patent No. 2,978,590, said scanning disc being provided with a central shaft 25 rigidly affixed thereto which is driven at high speed via belt 26 by a synchronous motor (not shown). The beam transmitted by the scanning disc is normally directed to the photocathode of a photomultiplier tube resulting in signals emitted by means of a suitable video amplifier to either a transmission apparatus or to the interpreter means of a suitable character recognition apparatus, all denoted as 27, and thence to an output device such as paper tape, card punch, magnetic tape station, etc. This scanning assembly is similar to that disclosed in co-pending U.S. application Serial Number 208,084, now Patent No. 3,205,367, granted September 7, 1965.

The output of the character recognition apparatus unit 27 is connected to an end of line or read zone indicator unit 27*a*, a unit 27*b* denoting a "document advanced— ready to read" signal or rescan signal, and a unit 27*c* denoting the stopping of the mirror. The output of the unit 27*a* is utilized to signal the apparatus for returning the oscillation mirror 12 as the end-of-line of characters or end of the reading zone has been sensed. Such end-of-line pulses may be derived for example from the trailing edge of a horizontal gate signal produced by a sweep mirror cam during sweeping of the mirror 12 in one direction through the reading zone scan. The end of a reading zone scan may be accomplished by a number of ways; for example, knowing the width of a document, the location of those areas on the document containing information to be read and the beginning of the document of a certain portion of the document, or the beginning of a line of characters, the character recognition apparatus can be programmed to generate an end-of-reading zone signal for regulating the extent of sweep movement of the sweep mirror during the scanning stroke. Further, one could readily insert along a scan line pre-determined symbols which could denote the end of a reading zone and produce a signal to initiate the return of the sweep mirror.

In a similar manner unit **27*b* denotes a ready-to-scan signal, which could be activated by a signal from the feed mechanism denoting a complete document advancement to a new line, or by a non-recognition or reject signal generated by the recognition logic, so that a mirror rescan of the information may be achieved. The unit 27*c*** has an output signal which also is responsive to the end of a reading zone or the return of the mirror to its initial scanning position, supplying an output signal to brake the sweep mirror motion until such a time that a mirror scan signal is generated.

The basic function of the demand sweep drive assembly of the present invention is to control the length of the mirror sweep by controlling the angular rotation of shaft 14 so as to commence a mirror sweep only upon demand by a pre-determined signal of some sort.

Figure 2:
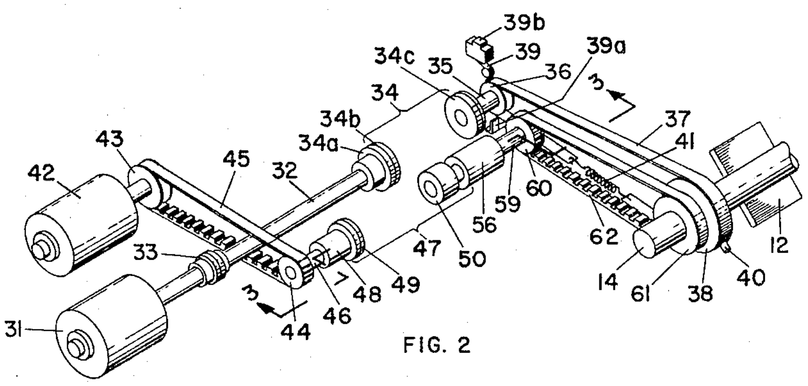
FIGURE 2 is a partially exploded isometric view of the sweep demand drive assembly.

Referring to FIGURE 2, and that part of FIGURE 1 illustrating the components of present invention, the oscillating mirror portion of the mirror sweep apparatus comprising the mirrors 12, 13 and shaft 14 is driven by motor 31, preferably a 30 r.p.m. synchronous motor, which provides a constant input drive to drive disc or plate **34*a* of slip clutch 34, shown in exploded representation in FIGURE 2, via shaft 32 and coupler 33 connecting the output shaft of motor 31 to shaft 32. The clutch 34 includes a friction plate 34*b* on the drive disc 34*a* and a driven disc or plate 34*c* abutting the friction plate 34*b* for transfer of driving torque from disc 34*a* to disc 34*c* when restraining forces on the latter are not above a selected value. Driven disc 34*c* is connected by output shaft 35 to flat periphery pulley 36 which drives flat periphery pulley 38 by means of a .005 inch thick steel belt 37 trained about the pulleys 36, 38. The ends of the belt 37 are joined by a shock absorption spring 41 and the belt is held against slippage relative to the peripheries of pulleys 36 and 38 respectively by studs 39 and 40 projecting through accommodating apertures in the belt 37. Belt 37 and pulleys 36, 38, provide a step-down speed from the 30 r.p.m. of output shaft 35 to 10.6 r.p.m., which is applied to shaft 14 connected to pulley 38 so as to move the images reflected by the scan mirror 12 at a preferred uniform sweep speed of 20 inches per second on the document. A fixed stop 39*a* is positioned in the path of stud 39 on pulley 36 at the limit position of the stud 39 in a counter-clockwise direction to prevent the pulley 36 from overtravelling to a point where the stud 39 withdraws from its accommodating aperture in the belt 37 if the brake means (to be later described) are not energized, so as to insure that the stud 39** is always located in the belt aperture and avoid slippage of the belt relative to or off of the pulleys.

The return portion of the sweep motion is controlled by motor 42, an 86 r.p.m. motor, the output shaft of which is connected to sprocket 43 which transfers driving torque to sprocket 44 by timing belt 45. The combination of sprockets 43, 44 and timing belt 45 steps down the output speed of motor 42 to 60 r.p.m. for delivery to the input shaft 46 of a conventional electric clutch/brake unit 47.

Figure 3:
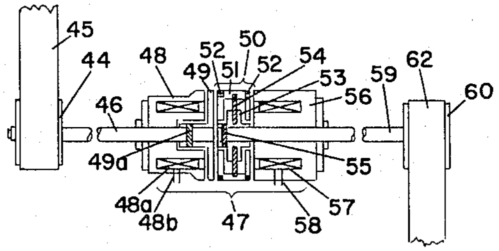
FIGURE 3 is somewhat diagramatic section view of the conventional electric clutch/brake assembly taken from the line 3—3 of FIGURE 2.

The conventional electric clutch/brake unit 47, which is shown in diagrammatic section in FIGURE 3, comprises a stationary clutch housing 48 wherein is located an electromagnet clutch coil **48*a* to which current may be supplied by wire connectors 48*b*, and a clutch drive disc 49 which is rigidly connected to the constantly rotating shaft 46 by means of pin 49*a*. Spaced axially along the axis of the input shaft 46 from the clutch drive disc 49 is a stationary brake housing 56, which concentrically surrounds a rotatable output shaft 59 axially aligned with the input shaft 46, the brake housing 56 having an electromagnet brake coil 57 therein to which current is supplied by wire connectors 58. An armature 50, shown in neutral position in FIGURE 3, is interposed between the clutch housing 48 and clutch drive disc 49, on the one hand, and the brake housing 56 on the other hand, and includes an outer annular rim member 51 and an inner hub member 53, both concentric with the axes of shafts 46 and 59. The hub member 53 is pinned to the output shaft 59, as indicated at 55, and the rim member 51 is connected to the hub member 53 by a flexible diaphragm 54 or similar radial flexible connecting means which holds the members against relative rotation but accommodates sufficient axial movement of the rim member 51 to permit it to engage either the brake housing 56 or clutch housing 48. The outer rim 51 is made of a magnetic material that is quickly responsive to magnetic field attraction by either the clutch coil 48*a* or brake coil 57 and further has friction surfaces 52 which engage the clutch drive disc 49 or the stationary brake housing 56**, depending upon whether a drive or braking operation is required.

The output shaft 59 of the electric clutch/brake system is connected to the center of sprocket 60 which is connected to a sprocket 61 via timing belt 62 trained about sprockets 60, 61, and sprocket 61 is keyed or otherwise suitably connected to shaft 14 which, as previously mentioned, carries pulley 38 and mirrors 12 and 13.

The operation of the apparatus of the present invention is as follows: As previously noted, the mirror 12 is driven by synchronous motor 31 during the scanning or read portion of the sweep through a slip clutch assembly 34 and the reduction pulley assembly 36–38, thereby rotating shaft 14 in a counter-clockwise direction as viewed in FIGURES 1 and 2, and causing a linear sweep of the scan mirror from the left to the right side of the document at the desired speed for reading the document. The slip clutch 34 is always trying to rotate the mirror shaft 14 across the document (left to right) at a uniform velocity and will effect such uniform rotational motion unless enough opposing torque is supplied to the shaft 14 to cause the slip clutch to slip or until the pulley assembly 36–38 is stopped by the co-action of pin 39 and fixed stop **39*a***.

The return portion of the sweep takes place when the movable outer rim member 51 of armature 50 in the electric clutch/brake unit 47 is attracted to the clutch drive disc 49 which is being constantly driven at 60 r.p.m. by motor 42 via a reduction sprocket drive assembly 43–45. Attraction of the rim member 51 to disc 49 is caused when the magnetic clutch coil **48*a* is energized by a signal applied to wire connectors 48*b*. When this attraction occurs, output shaft 59 of the electric clutch/brake system, which is connected to armature 50, supplies 60 r.p.m. rotary motion through the timing belt 62 and sprockets 60, 61 to the mirror shaft 14. This rotation is clockwise or opposite in direction to the 10.6 r.p.m. motion applied from the synchronous motor 31 via slip clutch 34 and reduction pulley system 36–38 to shaft 14, overriding the drive from motor 31 by causing said slip-clutch 34 to slip and rotating the mirror shaft 14** through a return sweep, right to left across the document, equal to 114 inches per second at the document, until the braking action is applied. As the pulley 38 is rotated in a clockwise direction during the return sweep, it transfers the same type of motion to pulley 36 via belt 37 until the braking action of the electric brake unit, as hereinafter will be described, stops the rotation of the pulleys 36, 38 at a position as shown in FIGURE 2, ready for another scan function to commence upon a read demand. Unless the return sweep is interrupted by prior signals to the brake coil 57, right to left rotation will be stopped by a microswitch 39*b* contacted by stud 39 at a limit position of the pulley assembly, which generates a signal to activate the braking unit. It is again noted at this point, that when the current to clutch coil 48*a* is cut off and the brake coil 57 is energized to apply braking action to stop the shaft rotation and the brake coil 57 is then cut off, the flexible diaphragm 54 returns the armature 50 to its neutral position as shown in FIGURE 3 and the slip-clutch 34, which is continually opposing the 60 r.p.m. return sweep motion, becomes the dominant and only force and again rotates the mirror shaft 14 back (left to right) in the opposite direction to perform a scan function.

The magnetic brake mechanism 56–58 which is a part of the electric clutch/brake assembly is used to stop the rotating of the mirror shaft 14 when any of a number of selected events occur, such as, for example, when the return sweep (right to left across the document) has reached the left edge of the document, which may be detected in any suitable way by the scanning unit. The brake is applied so as to stop the mirror shaft, 14 and hold said mirror shaft in a position to scan from left to right upon receipt of other electrical signals from the feed and/or character recognition apparatus for initiating a new scan. Thus, scans are initiated by de-energizing the brake coil 57 following energization of this coil to terminate the last return sweep. The magnetic brake operates by applying electrical energy via leads 58 to the magnetic brake-coil 57 located within the stationary brake housing 56, whereby when said energy is applied, outer rim member 51 of the armature 50 is drawn into contact with the stationary brake housing so as to stop any rotation of mirror shaft 14 via shaft 59 and the sprocket drive assembly 60–62.

It can be readily seen that input control signals applied to the clutch coil 48*a* and brake coil 57 of the electric clutch/brake system, can be varied at will so as to be suitable for almost any desired program. The following describes a normal cycle of events disclosing how the demand sweep may be operated: The mirror shaft 14 is held by the magnetic brake 56–58 at the left edge of the document until a scan is demanded, whereupon the brake is de-energized and the slip clutch 34 transfers torque to the pulley 36 so as to drive the shaft 14 and cause the scan mirror 12 to sweep at a uniform velocity, linearly across the document for either the whole length of the document or a predetermined length, at which time the clutch drive 48 is energized to return the mirror 12 at an increased speed to the left edge of the document, whereupon the electric brake 56–58 is again energized to hold the mirror 12 until a subsequent scan is required. The return scan can be initiated by signals signifying detection of the end of a line of characters, or detection of a selected number of characters or any other desired event, in a manner well known in the automatic character recognition art.

Figure 4:
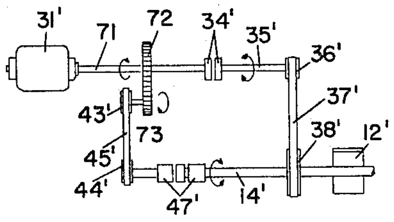
FIGURE 4 is a plan view of an alternate embodiment of the invention.
Figure 5:
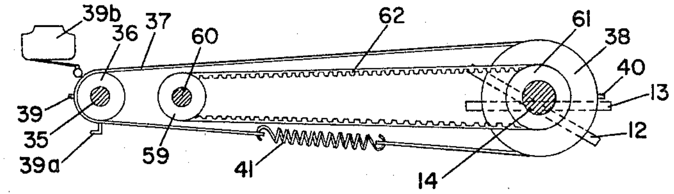
FIGURE 5 is a section view taken along the line 5—5 of FIGURE 1.

A second preferred embodiment of the present invention is shown in FIGURE 4 wherein only one motor or drive means 31′ is used to drive the read and return portions of the mirror sweep. The read portion of the sweep apparatus is the same as that described in FIGURES 1 and 2 and therefore will be briefly accounted for. Shaft 71, the output shaft of synchronous motor 31′, drives the input of a slip clutch 34′, the output shaft 35′ of slip clutch 34′ driving a pulley system including flat periphery pulleys 36′, 38′ and steel belt 37′, wherein the pulley 38′ is connected to shaft 14′ upon which the optical scanning mirror 12′ is located so as to rotate the same in a counter-clockwise direction and at a uniform velocity with respect to the document being scanned. The return portion of the sweep apparatus is connected to output shaft 71 of the motor 31′ by means of gears 72, 73, the rotational torque being transferred to gear 73 and associated shaft at an increased speed. The output shaft of gear 73 is connected via sprockets 43′, 44′ and timing belt as described with regard to FIGURE 3. The output of the electric clutch/brake mechanism 47′ is directly connected to mirror shaft 14′. With this arrangement when the clutch/brake mechanism 47′ is in neutral condition, the motor 31′ will drive the mirror 12′ through the read sweep through slip clutch 34′ in the usual manner. When the clutch coil is energized, the mirror 12′ is rotated in a clockwise direction through the return sweep phase, the gear drive 72–73 overriding the slip clutch 34. By energizing the brake coil, the mirror shaft may be stopped at any pre-determined position.

This invention presents a versatile mirror optical scanning drive assembly which can be readily controlled to adapt to most any demanded function, thereby obviating many of the disadvantages found in prior art devices.

While but two preferred examples of the present invention have been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. In apparatus for reading intelligence-bearing items arranged in lines of items comprising means for scanning the items in scanning strokes each spanning a plurality of the items arranged in a line of items, a first continuously moving drive source for continuously applying a first driving force to the scanning means, friction step clutch means for transferring motion from said drive source to said scanning means for moving the same in a first direction through a scanning stroke along line of items operative to slip when forces opposing movement in said first direction exceed a selected torque value, a second continuously moving drive source normally disconnected from said scanning means and selectively coupled to said scanning means for applying driving movement to the same with a second driving force superior to said first driving force and exceeding said selected value to move the scanning means in a second direction at a different speed relative to said first direction, through a return stroke, and control means responsive to electrical signals applied thereto for connecting said second drive source to said scanning means at any position of the scanning means during movement thereof in said first direction to apply said superior second driving force to said scanning means in opposition to said first driving force to overpower the latter and drive said scanning means in said second direction.

2. In apparatus for reading intelligence-bearing items, the combination recited in claim 1 wherein said control means includes electric clutch means for initiating movement of said scanning means through said return stroke at varied positions of said scanning means in said scan stroke.

3. In apparatus for reading intelligence-bearing items, the combination recited in claim 1 wherein said control means includes electric brake means for stopping the scanning means in said return stroke for a subsequent movement through said scan stroke after the scanning means has moved past a pre-determined position in said return stroke.

4. In apparatus for reading intelligence-bearing items, means for optically scanning the area of an item to be read, a slip clutch having an input and output, continuously driven means driving the input of said slip clutch, a shaft supporting said optical scanning means for rotation about the axis of the shaft, means connecting the output of said slip clutch to said shaft and driving the scanning means in a first direction over the item at a uniform velocity, an electric clutch having an input shaft, means for driving the input shaft of said electric clutch at an increased speed relative to said continuously driven means, armature means located near said electric clutch and connected to the shaft supporting said optical scanning means, means for energizing said armature to couple the same with said electric clutch so as to overcome the drive from the slip clutch and rotate said optical scanning means in a second direction opposite to said first direction, brake means adjacent said armature including means for drawing said armature into contact with said brake means at any predetermined time for stopping and holding further rotation of said optical scanning means.

5. In apparatus for reading intelligence-bearing items, apparatus for holding in position an item to be read, illuminating apparatus, first mirror means for directing light rays from said illuminating apparatus on a selected area of the item to be read, second mirror means for directing the light from said selected area of the item to form an image of same on a lens, a mirror shaft supporting said first and second mirror means in fixed position thereon, the improvement comprising apparatus for rotating said mirror shaft including a first continuously rotating drive source, a slip clutch, a second continuously rotating drive source, a controlled clutch and a controlled brake, said slip clutch frictionally coupling said first continuous rotating drive source to said mirror shaft so as to urge same to rotate in a first direction at a first speed, said controlled clutch being connected to said mirror shaft and responsive to a signal applied thereto so as to overcome the driving force through said slip clutch to said mirror shaft and drive the latter in an opposite direction at a second speed, said controlled brake also being connected to said mirror shaft so as to stop any rotation of the mirror shaft and hold same in a fixed position in response to a braking control signal applied thereto.

6. In apparatus for reading intelligence-bearing items arranged in lines of items, means for scanning the items in scanning strokes each spanning a plurality of the items in a line of items, first continuously driven means coupled to said scanning means and continuously applying a first driving force thereto for moving the scanning means relative to the items, in a first direction through a read stroke along a line of the items, second continuously driven means normally disconnected from said scanning means and selectively connectible thereto to apply a second driving force thereto superior to said first driving force for moving said scanning means through a return stroke in a second direction opposite to said first direction, and means responsive to electrical signals for connecting said second driven means to said scanning means to apply said superior second driving force to said scanning means in opposition to said first driving force to overpower the latter and initiate return movement of said scanning means in said second direction at any position during movement of said scanning means in said first direction.

7. Apparatus as defined in claim 6, wherein said second driven means drives said scanning means in said second direction at an increased speed relative to the speed of movement in said first direction.

References Cited by the Examiner

UNITED STATES PATENTS

| | | | |
|---|---|---|---|
| 2,262,584 | 11/1941 | Herriott | 178—7.6 |
| 3,069,494 | 12/1962 | Fischer | 340—146.3 |

DAVID G. REDINBAUGH, *Primary Examiner.*

J. A. ORSINO, *Assistant Examiner.*